(12) United States Patent
Pieri et al.

(10) Patent No.: US 9,803,036 B2
(45) Date of Patent: Oct. 31, 2017

(54) METHOD FOR MANUFACTURING FLUOROPOLYMERS

(75) Inventors: Riccardo Pieri, Milan (IT); Valeri Kapeliouchko, Alessandria (IT); Liubov Chernysheva, Caronno Pertusella (IT)

(73) Assignee: Solvay Specialty Polymers Italy S.P.A., Bollate (Milan) (IT)

( * ) Notice: Subject to any disclaimer, the term of this patent is extended or adjusted under 35 U.S.C. 154(b) by 0 days.

(21) Appl. No.: 13/515,973

(22) PCT Filed: Dec. 16, 2010

(86) PCT No.: PCT/EP2010/069955
§ 371 (c)(1),
(2), (4) Date: Jun. 14, 2012

(87) PCT Pub. No.: WO2011/073337
PCT Pub. Date: Jun. 23, 2011

(65) Prior Publication Data
US 2012/0283383 A1 Nov. 8, 2012

(30) Foreign Application Priority Data

Dec. 18, 2009 (EP) .................................. 09179997

(51) Int. Cl.
*C08F 6/14* (2006.01)
*C08F 14/18* (2006.01)

(52) U.S. Cl.
CPC .............. *C08F 6/14* (2013.01); *C08F 14/18* (2013.01)

(58) Field of Classification Search
CPC .... C08F 14/18; C08F 6/14; C08F 2/24; C08F 2/32; C08L 27/12
USPC ................ 524/805; 526/242; 53/805
See application file for complete search history.

(56) References Cited

U.S. PATENT DOCUMENTS

| | | | |
|---|---|---|---|
| 3,242,218 A | 3/1966 | Miller | |
| 3,665,041 A | 5/1972 | Sianesi et al. | |
| 3,715,378 A | 2/1973 | Belardinelli et al. | |
| 4,523,039 A | 6/1985 | Lagow et al. | |
| 4,864,006 A * | 9/1989 | Giannetti | C08F 14/18 526/206 |
| 4,990,283 A * | 2/1991 | Visca et al. | 516/30 |
| 5,285,002 A | 2/1994 | Grootaert | |
| 5,498,680 A * | 3/1996 | Abusleme et al. | 526/209 |
| 5,656,201 A | 8/1997 | Visca et al. | |
| 5,670,088 A | 9/1997 | Chittofrati et al. | |
| 5,698,138 A | 12/1997 | Visca et al. | |
| 5,725,802 A | 3/1998 | Chittofrati et al. | |
| 6,395,848 B1 * | 5/2002 | Morgan et al. | 526/214 |
| 6,429,258 B1 * | 8/2002 | Morgan et al. | 524/805 |
| 6,555,639 B2 * | 4/2003 | Apostolo et al. | 526/206 |
| 2002/0177664 A1 * | 11/2002 | Albano et al. | 525/199 |
| 2005/0009944 A1 * | 1/2005 | Apostolo et al. | 522/113 |
| 2006/0025529 A1 * | 2/2006 | Apostolo et al. | 525/199 |
| 2006/0166007 A1 * | 7/2006 | Kent et al. | 428/421 |
| 2007/0015866 A1 * | 1/2007 | Hintzer et al. | 524/544 |
| 2007/0112156 A1 * | 5/2007 | Guarda et al. | 526/247 |
| 2009/0105420 A1 * | 4/2009 | Abusleme et al. | 525/200 |
| 2009/0186969 A1 * | 7/2009 | Coughlin et al. | 524/148 |
| 2010/0029878 A1 | 2/2010 | Matsuoka et al. | |
| 2011/0136948 A1 * | 6/2011 | Guarda et al. | 524/83 |
| 2012/0283383 A1 * | 11/2012 | Pieri et al. | 524/757 |
| 2013/0225764 A1 * | 8/2013 | Tatemoto et al. | 524/805 |
| 2013/0264522 A1 * | 10/2013 | Stanga et al. | 252/500 |
| 2014/0200310 A1 * | 7/2014 | Taira et al. | 524/758 |

FOREIGN PATENT DOCUMENTS

| | | |
|---|---|---|
| CA | 786877 A | 6/1968 |
| EP | 148482 B1 | 3/1992 |
| EP | 686447 A2 | 12/1995 |
| EP | 816397 A1 | 1/1998 |
| EP | 860436 B1 | 5/2004 |
| EP | 1783167 A1 | 5/2007 |
| EP | 1942118 A1 | 7/2008 |
| EP | 2058291 A1 | 5/2009 |
| GB | 1226566 A | 3/1971 |
| JP | 2006321797 A | 11/2006 |
| JP | 2007283224 A | 11/2007 |
| WO | WO 8700538 A1 | 1/1987 |
| WO | WO 2008060460 A1 | 5/2008 |
| WO | WO 2008076746 A1 | 6/2008 |
| WO | WO 2008132959 A1 | 11/2008 |

* cited by examiner

*Primary Examiner* — Michael A Salvitti
(74) *Attorney, Agent, or Firm* — Osha Liang LLP

(57) ABSTRACT

The invention pertains to a process for manufacturing a (per)fluoropolymer, said process comprising polymerizing one or more fluorinated monomers in the presence of a multi-phase medium, said medium comprising:
(A) a water phase [phase (W)];
(B) at least one fluorinated surfactant [surfactant (FS)] having formula (I) here below:

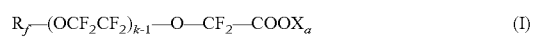

$$R_f\text{—}(OCF_2CF_2)_{k-1}\text{—}O\text{—}CF_2\text{—}COOX_a \qquad (I)$$

wherein $R_f$ is a $C_1$-$C_3$ perfluoroalkyl group comprising, optionally, one or more ether oxygen atoms, k is 2 or 3 and $X_a$ is a selected from a monovalent metal and an ammonium group of formula $NR^N_4$, wherein $R^N$, equal or different at each occurrence, is a hydrogen atom or a $C_1$-$C_3$ alkyl group;
(C) an oil phase [phase (O)] comprising:
  at least one non-functional (per)fluoropolyether (non-functional PFPE) comprising at least one (per)fluoropolyoxyalkylene chain [chain ($R_F$)] and
  at least one functional (per)fluoropolyether (functional PFPE) comprising at least one (per)fluoropolyoxyalkylene chain [chain ($R'_F$)] and having a number average molecular weight of at least 1000 and a solubility of less than 1% by weight in water at 25° C.

12 Claims, No Drawings

METHOD FOR MANUFACTURING FLUOROPOLYMERS

CROSS-REFERENCE TO RELATED APPLICATIONS

This application is a U.S. national stage entry under 35 U.S.C. §371 of International Application No. PCT/EP2010/069955 filed Dec. 16, 2010, which claims priority to European application No. 09179997.3 filed Dec. 18, 2009, the whole content of this application being incorporated herein by reference for all purposes.

TECHNICAL FIELD

The invention pertains to a method for manufacturing a fluoropolymer, to fluoropolymers therefrom and to multi-phase media useful in said method.

BACKGROUND ART

Microemulsions based on perfluoropolyethers have been long known and have been used in several applications, in particular for stabilizing dispersions of additives in lubricating oils or as additives in polymerization processes of fluorinated monomers.

Thus, U.S. Pat. No. 4,990,283 (AUSIMONT S.P.A.) 5 Feb. 1991, U.S. Pat. No. 5,656,201 (AUSIMONT S.P.A) 12 Aug. 1997, U.S. Pat. No. 5,670,088 (AUSIMONT S.P.A.) 23 Sep. 1997, U.S. Pat. No. 5,698,138 (AUSIMONT S.P.A.) 16 Dec. 1997 and U.S. Pat. No. 5,725,802 (AUSIMONT S.P.A) 10 Mar. 1998 disclose microemulsions comprising an aqueous medium, a perfluoropolyether typically having an average molecular weight ranging from 400 and 3000 and a fluorinated surfactant, the surfactant being typically selected among $C_5$-$C_{11}$ perfluorocarboxylic acids and salts thereof, and use thereof as additives in polymerization processes of fluorinated monomers.

Recently, perfluoroalkanoic acids having eight or more than eight carbon atoms have raised environmental concerns. Accordingly, efforts are now devoted to phase out from such compounds and methods have been developed to manufacture fluoropolymer products by aqueous polymerization procedures using alternative surfactants having a more favourable toxicological profile.

Fluorinated surfactants having general formula $R_f$—$(OCF_2CF_2)_{k-1}$—O—$CF_2$—$COONH_4$, wherein $R_f$ is typically a $C_1$-$C_3$ perfluoroalkyl group and k is typically 2 or 3, in particular $CF_3CF_2OCF_2CF_2OCF_2COONH_4$, which are known to be endowed with a bioaccumulation profile typically lower than that of perfluoroalkanoic acids having eight or more than eight carbon atoms, are notably used as polymerization emulsifiers in the aqueous emulsion polymerization of fluorinated monomers, as disclosed in JP 2006321797 A (ASAHI GLASS CO. LTD.) 30 Nov. 2006, JP 2007283224 A (ASAHI GLASS CO. LTD.) 1 Nov. 2007, WO 2008/132959 (ASAHI GLASS CO. LTD.) 6 Nov. 2008 and EP 2058291 A (ASAHI GLASS CO. LTD.) 13 May 2009. Nevertheless, emulsion polymerization processes disclosed therein fail to provide for small-sized polymer dispersed particles and high polymerization rates.

It would thus be desirable to find alternative routes for manufacturing fluoropolymers in a convenient and cost-effective way through fast reaction rates using equipments commonly used in the aqueous polymerization of fluorinated monomers with traditional fluorinated surfactants.

DISCLOSURE OF INVENTION

It is thus an object of the present invention a process for manufacturing a (per)fluoropolymer, said process comprising polymerizing one or more fluorinated monomers in the presence of a multi-phase medium, said medium comprising:

(A) a water phase [phase (W)];
(B) at least one fluorinated surfactant [surfactant (FS)] having formula (I) here below:

$$R_f\text{—}(OCF_2CF_2)_{k-1}\text{—}O\text{—}CF_2\text{—}COOX_a \qquad (I)$$

wherein $R_f$ is a $C_1$-$C_3$ perfluoroalkyl group comprising, optionally, one or more ether oxygen atoms, k is 2 or 3 and $X_a$ is selected from a monovalent metal and an ammonium group of formula $NR^N_4$, wherein $R^N$, equal or different at each occurrence, is a hydrogen atom or a $C_1$-$C_3$ alkyl group;

(C) an oil phase [phase (O)] comprising:
    at least one non-functional (per)fluoropolyether (non-functional PFPE) comprising at least one (per)fluoropolyoxyalkylene chain [chain ($R_F$)] and
    at least one functional (per)fluoropolyether (functional PFPE) comprising at least one (per)fluoropolyoxyalkylene chain [chain ($R'_F$)] and having a number average molecular weight of at least 1000 and a solubility of less than 1% by weight in water at 25° C.

The Applicant has surprisingly found that by means of the process of the invention it is advantageously possible to successfully obtain with high reaction rates nano-sized fluoropolymer dispersed particles while also significantly lowering toxicological and environmental impact of traditional perfluorocarboxylate surfactants.

The polymerization process of the invention is preferably an aqueous emulsion polymerization process advantageously yielding homogeneously dispersed nano-sized droplets in a kinetically stable, optically transparent, isotropic dispersion, at room temperature, of two immiscible phases, such as a water phase [phase (W)] and an oil phase [phase (O)], stabilized by an interfacial film of fluorinated surfactant molecules [surfactant (FS)].

The fluorinated monomer of the process of the invention is typically a gaseous fluorinated monomer. By "gaseous fluorinated monomer" it is meant a monomer which is present as a gas under the polymerization conditions.

Nevertheless, liquid fluorinated monomers under the polymerization conditions may also be used in the polymerization process of the present invention.

Representative examples of suitable fluorinated monomers include, notably, partially and fully fluorinated monomers like, e.g., tetrafluoroethylene (TFE), chlorotrifluoroethylene (CTFE), hexafluoropropylene (HFP), vinyl fluoride (VF), vinylidene fluoride (VDF), perfluoroalkyl- or perfluoroalkoxy-vinyl ethers having formula $CF_2$=CF—O—R f, wherein $R_f$ represents a $C_1$-$C_{12}$ perfluoroalkyl group comprising, optionally, one or more ether oxygen atoms, and mixtures thereof.

The polymerization may further involve non-fluorinated monomers like, e.g., ethylene and propylene.

Still further, the polymerization may involve co-monomers having at least one functional group like, e.g., a group capable of participating in a peroxide cure reaction. Such functional groups include, notably, halogen atoms like, e.g., bromine or iodine atoms as well as nitrile groups.

According to an embodiment of the invention, the multi-phase medium is fed into a reactor system prior to addition thereto of one or more fluorinated monomers.

The water phase [phase (W)] of the multi-phase medium typically comprises water-soluble ingredients like, e.g., aqueous buffer solutions.

The fluorinated surfactant [surfactant (FS)] having formula (I) of the multi-phase medium preferably complies with formula (II) here below:

$$R_f'O-CF_2CF_2-O-CF_2-COOX_a' \quad (II)$$

wherein:

$R_f'$ is a $C_1$-$C_3$ perfluoroalkyl group;

$X_a'$ is selected from Li, Na, K, $NH_4$ and $NR^{N'}_4$, wherein $R^{N'}$ is a $C_1$-$C_3$ alkyl group.

The fluorinated surfactant [surfactant (FS)] having formula (I) of the multi-phase medium more preferably complies with formula (III) here below:

$$CF_3CF_2O-CF_2CF_2-O-CF_2-COOX_a' \quad (III)$$

wherein $X_a'$ has the same meaning as defined above.

A mixture of more than one surfactant (FS) having formula (I) as described above may also be used in the multi-phase medium.

The total amount of surfactant(s) (FS) having formula (I) as described above used in the process of the invention typically ranges between 0.001% by weight and 5% by weight, preferably between 0.05% by weight and 1% by weight with respect to the total weight of water in the polymerization process.

The (per)fluoropolyoxyalkylene chain [chain ($R_F$)] of the non-functional PFPE of the oil phase [phase (O)] of the multi-phase medium typically comprises one or more recurring units R' having general formula $-(CJJ')_j-CKK'-O-$, wherein J and J', equal to or different from each other, independently represent a fluorine atom or a $C_1$-$C_6$ (per)fluoro(oxy)alkyl group, K and K', equal to or different from each other, independently represent a hydrogen atom, a fluorine atom, a chlorine atom or a $C_1$-$C_6$ (per)fluoro(oxy) alkyl group and j is an integer comprised between 0 and 3, said recurring units being generally statistically distributed along the (per)fluoropolyoxyalkylene chain.

The non-functional PFPE of the phase (O) of the multi-phase medium is typically free from functional end-groups.

The non-functional PFPE of the phase (O) of the multi-phase medium is preferably selected from:

$$T^1-O-[CF(CF_3)CF_2O]_{b1'}(CFYO)_{b2'}-T^{1'} \quad (1)$$

wherein:

$T^1$ and $T^{1'}$, equal to or different from each other, are independently selected from $-CF_3$, $-C_2F_5$ and $-C_3F_7$ groups;

Y, equal or different at each occurrence, is selected from a fluorine atom and a $-CF_3$ group;

b1' and b2', equal to or different from each other, are independently integers ≥0 such that the b1'/b2' ratio is comprised between 20 and 1000 and the (b1+b2') sum is comprised between 5 and 250; should b1' and b2' be both different from zero, the different recurring units are generally statistically distributed along the perfluoropolyoxyalkylene chain.

Said products can be obtained by photooxidation of $C_3F_6$ as described in CA 786877 (MONTEDISON S.P.A.) 4 Jun.

1968 and by subsequent conversion of the end groups as described in GB 1226566 (MONTECATINI EDISON S.P.A.) 31 Mar. 1971.

$$T^1-O-[CF(CF_3)CF_2O]_{c1'}(C_2F_4O)_{c2'}(CFYO)_{c3'}-T^{1'} \quad (2)$$

wherein:

$T^1$ and $T^{1'}$, equal to or different from each other, have the same meaning as defined above;

Y, equal or different at each occurrence, has the same meaning as defined above;

c1', c2' and c3', equal to or different from each other, are independently integers ≥0 such that the (c1'+c2'+c3') sum is comprised between 5 and 250; should at least two of c1', c2' and c3' be different from zero, the different recurring units are generally statistically distributed along the perfluoropolyoxyalkylene chain.

Said products can be manufactured by photooxidation of a mixture of $C_3F_6$ and $C_2F_4$ and subsequent treatment with fluorine as described in U.S. Pat. No. 3,665,041 (MONTECATINI EDISON S.P.A.) 23 May 1972.

$$T^1-O-(C_2F_4O)_{d1'}(CF_2O)_{d2'}-T^{1'} \quad (3)$$

wherein:

$T^1$ and $T^{1'}$, equal to or different from each other, have the same meaning as defined above;

d1' and d2', equal to or different from each other, are independently integers ≥0 such that the d1'/d2' ratio is comprised between 0.1 and 5 and the (d1'+d2') sum is comprised between 5 and 250; should d1' and d2' be both different from zero, the different recurring units are generally statistically distributed along the perfluoropolyoxyalkylene chain.

Said products can be produced by photooxidation of $C_2F_4$ as reported in U.S. Pat. No. 3,715,378 (MONTECATINI EDISON S.P.A.) 6 Jun. 1973 and subsequent treatment with fluorine as described in U.S. Pat. No. 3,665,041 (MONTECATINI EDISON S.P.A.) 23 May 1972.

$$T^2-O-[CF(CF_3)CF_2O]_{e'}-T^{2'} \quad (4)$$

wherein:

$T^2$ and $T^{2'}$, equal to or different from each other, are independently selected from $-C_2F_5$ and $-C_3F_7$ groups;

e' is an integer comprised between 5 and 250.

Said products can be prepared by ionic hexafluoropropylene epoxide oligomerization and subsequent treatment with fluorine as described in U.S. Pat. No. 3,242,218 (E. I. DU PONT DE NEMOURS AND CO.) 22 Mar. 1966.

$$T^2-O-(CF_2CF_2O)_{f'}-T^{2'} \quad (5)$$

wherein:

$T^2$ and $T^{2'}$, equal to or different from each other, have the same meaning as defined above;

f' is an integer comprised between 5 and 250.

Said products can be obtained by a method comprising fluorinating a polyethyleneoxide, e.g. with elemental fluorine, and optionally thermally fragmentating the so-obtained fluorinated polyethyleneoxide as reported in U.S. Pat. No. 4,523,039 (THE UNIVERSITY OF TEXAS) 11 Jun. 1985.

$$T^1-O-(CF_2CF_2C(Hal')_2O)_{g1'}-(CF_2CF_2CH_2O)_{g2'}-(CF_2CF_2CH(Hal')O)_{g3'}-T^{1'} \quad (6)$$

wherein:

$T^1$ and $T^{1'}$, equal to or different from each other, have the same meaning as defined above;

Hal', equal or different at each occurrence, is a halogen selected from fluorine and chlorine atoms, preferably a fluorine atom;

g1', g2', and g3', equal to or different from each other, are independently integers 0 such that the (g1'+g2'+g3') sum is comprised between 5 and 250; should at least two of g1', g2' and g3' be different from zero, the different recurring units are generally statistically distributed along the (per)fluoropolyoxyalkylene chain.

Said products may be prepared by ring-opening polymerizing 2,2,3,3-tetrafluorooxethane in the presence of a polymerization initiator to give a polyether comprising repeating units of the formula: —CH$_2$CF$_2$CF$_2$O—, and optionally fluorinating and/or chlorinating said polyether, as detailed in EP 148482 B (DAIKIN INDUSTRIES LTD.) 25 Mar. 1992.

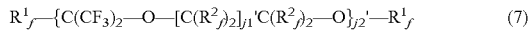
(7)

wherein:
R$^1_f$, equal or different at each occurrence, is a C$_1$-C$_6$ perfluoroalkyl group;
R$^2_f$, equal or different at each occurrence, is selected from a fluorine atom and a C$_1$-C$_6$ perfluoroalkyl group;
j1' is equal to 1 or 2;
j2' is an integer comprised between 5 and 250.

Said products can be produced by the copolymerization of hexafluoroacetone with an oxygen-containing cyclic comonomer selected from ethylene oxide, propylene oxide, epoxy-butane and/or trimethylene oxide (oxethane) or substituted derivatives thereof and subsequent perfluorination of the resulting copolymer, as detailed in patent application WO 87/00538 (LAGOW ET AL.) 29 Jan. 1987.

The non-functional PFPE of the phase (O) of the multi-phase medium is more preferably selected from:

(i) non-functional PFPEs commercially available from Solvay Solexis S.p.A. under the trade names GALDEN® and FOMBLIN®, said PFPEs generally comprising at least one PFPE complying with formula here below:

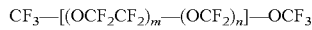

m+n=40-180; m/n=0.5-2

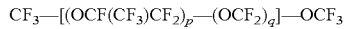

p+q=8-45; p/q=20-1000

(ii) non-functional PFPEs commercially available from Daikin under the trade name DEMNUM®, said PFPEs generally comprising at least one PFPE complying with formula here below:

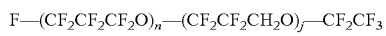

j=0 or integer >0; n+j=10-150

(iii) non-functional PFPEs commercially available from Du Pont de Nemours under the trade name KRYTOX®, said PFPEs generally comprising at least one low-molecular weight, fluorine end-capped, homopolymer of hexafluoropropylene epoxide complying with formula here below:

n=10-60

Preferred phases (O) of the multi-phase medium comprise at least one non-functional PFPE commercially available from Solvay Solexis S.p.A. under the trade names GALDEN® and FOMBLIN® as described hereinabove.

More preferred phases (O) of the multi-phase medium comprise at least one non-functional PFPE commercially available from Solvay Solexis S.p.A. under the trade name GALDEN® as described hereinabove, typically having a number average molecular weight ranging between 400 and 1500, preferably between 500 and 1000, more preferably between 600 and 800.

A mixture of more than one non-functional PFPE as defined above may also be used in the phase (O) of the multi-phase medium.

The (per)fluoropolyoxyalkylene chain [chain (R'$_F$)] of the functional PFPE of the oil phase [phase (O)] of the multi-phase medium typically comprises one or more recurring units R" having general formula —(CF$_2$)$_j$—CFZO—, wherein Z is selected from a fluorine atom and a C$_1$-C$_5$ (per)fluoro(oxy)alkyl group and j is an integer comprised between 0 and 3, the recurring units being generally statistically distributed along the (per)fluoropolyoxyalkylene chain.

The functional PFPE of the phase (O) of the multi-phase medium has a number average molecular weight of preferably at least 1300, more preferably at least 1500.

The "number average molecular weight" is hereby expressed by the formula here below:

$$M_n = \frac{\sum M_i \cdot N_i}{\sum N_i}$$

wherein N$_i$ represents the number of molecules having average molecular weight M$_i$.

The functional PFPE of the phase (O) of the multi-phase medium has a solubility of preferably less than 0.5%, more preferably less than 0.1% by weight, in water at 25° C.

The functional PFPE of the phase (O) of the multi-phase medium typically comprises at least one functional end-group.

The functional PFPE of the phase (O) of the multi-phase medium preferably comprises at least one functional end-group selected from carboxylic acid, phosphonic acid and sulphonic acid groups.

The functional PFPE of the phase (O) of the multi-phase medium more preferably complies with formula (IV) here below:

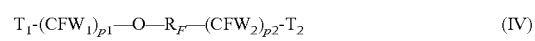
(IV)

wherein:
R$_F$ is a (per)fluoropolyoxyalkylene chain [chain (R'$_F$)] as defined above such that the number average molecular weight of the functional PFPE is at least 1000, preferably at least 1300, more preferably at least 1500;
T$_1$ and T$_2$, equal to or different from each other, are selected from:
i) functional end-groups selected from carboxylic acid, phosphonic acid and sulphonic acid groups, and
ii) non-functional end-groups selected from a fluorine atom, a chlorine atom and a C$_1$-C$_3$ (per)fluoroalkyl group comprising, optionally, one or more chlorine atoms,
with the proviso that at least one of T$_1$ and T$_2$ is a functional end-group as defined above;
W$_1$ and W$_2$, equal to or different from each other, independently represent a fluorine atom or a —CF$_3$ group;
p$_1$ and p$_2$, equal to or different from each other, are independently integers comprised between 1 and 3, preferably being equal to 1 when W$_1$ and/or W$_2$ are —CF$_3$ groups.

Preferred phases (O) of the multi-phase medium comprise at least one functional PFPE complying with formula (IV) as described above wherein both T$_1$ and T$_2$ are functional end-groups as defined above (bifunctional PFPE).

Non-limiting examples of suitable bifunctional PFPEs include, notably, those complying with formula (V) here below:

$$HOOC-CFW_1-O-R_F-CFW_2-COOH \quad (V)$$

wherein:
$R_F$ is a (per)fluoropolyoxyalkylene chain [chain ($R'_F$)] as defined above such that the number average molecular weight of the bifunctional PFPE is at least 1000, preferably at least 1300, more preferably at least 1500;
$W_1$ and $W_2$, equal to or different from each other, have the same meaning as defined above.

More preferred phases (O) of the multi-phase medium comprise at least one bifunctional PFPE complying with formula (VI) here below:

$$HOOC-CF_2-O-(CF_2)_{n'}(CF_2CF_2O)_{m'}-CF_2-COOH \quad (VI)$$

wherein n' and m' are independently integers >0 such that the number average molecular weight of the bifunctional PFPE is at least 1000, preferably at least 1300, more preferably at least 1500, the recurring units being generally statistically distributed along the perfluoropolyoxyalkylene chain.

A mixture of more than one functional PFPE as defined above may also be used in the phase (O) of the multi-phase medium.

Even more preferred phases (O) of the multi-phase medium consist essentially of at least one non-functional PFPE as defined above and at least one functional PFPE as defined above.

The Applicant has surprisingly found that a functional PFPE as defined above, having a number average molecular weight of at least 1000 and a solubility of less than 1% in water at 25° C., advantageously enables stabilization of two immiscible phases, a water phase [phase (W)] and an oil phase [phase (O)] as defined above, in the presence of a surfactant (FS) having formula (I) as described above, so that multi-phase media kinetically stable even upon dilution can be successfully obtained and used as polymerizing media for yielding nano-sized fluoropolymer dispersed particles with high reaction rates.

Good results have been obtained in the presence of a multi-phase medium comprising at least one surfactant (FS) having formula (I) as described above and at least one functional PFPE as defined above in a weight ratio ranging between 1:0.1 and 1:1.

Very good results have been obtained in the presence of a multi-phase medium comprising at least one surfactant (FS) having formula (I) as described above and at least one functional PFPE as defined above in a weight ratio ranging between 1:0.3 and 1:0.9.

The polymerization process of the invention is carried out at temperatures typically ranging between 10° C. and 150° C., preferably between 20° C. and 130° C., more preferably between 40° C. and 100° C.

The polymerization process is carried out at pressures typically ranging between 2 and 50 bar, preferably between 5 and 40 bar.

The polymerization process of the invention is typically started by an initiator. Suitable initiators include any of the initiators known for initiating a free radical polymerization of fluorinated monomers.

Non-limiting examples of suitable initiators include, notably, inorganic initiators and peroxide initiators.

Representative examples of inorganic initiators include, notably, ammonium-, alkali- or earth alkali-salts of persulfates or (per)manganic acids. A persulfate initiator, e.g. ammonium persulfate, can be used on its own or may be used in combination with a reducing agent. Suitable reducing agents include bisulfites such as, e.g., ammonium bisulfite or sodium metabisulfite, thiosulfates such as, e.g., ammonium, potassium or sodium thiosulfate, hydrazines, azodicarboxylates and azodicarboxyldiamide. Further reducing agents which may be used include sodium formaldehyde sulfoxylate (Rongalite) or fluoroalkyl sulfinates as disclosed in U.S. Pat. No. 5,285,002 (MINNESOTA MINING AND MANUFACTURING CO.) 8 Feb. 1994. The reducing agent typically reduces the half-life time of the persulfate initiator. Additionally, a metal salt catalyst such as, e.g., copper, iron or silver salts may be added.

Representative examples of peroxide initiators include, notably, hydrogen peroxide, sodium or barium peroxide, diacylperoxides such as, e.g., diacetylperoxide, disuccinyl peroxide, dipropionylperoxide, dibutyrylperoxide, dibenzoylperoxide, di-tert-butylperoxide, benzoylacetylperoxide, diglutaric acid peroxide and dilaurylperoxide, and further per-acids and salts thereof such as, e.g., ammonium, sodium or potassium salts. Specific examples of per-acids include, notably, peracetic acid. Esters of the peracid can be used as well and examples thereof include tert-butylperoxyacetate and tert-butylperoxypivalate.

The amount of initiator typically ranges between 0.01% and 1% by weight, preferably between 0.01 and 0.5% by weight with respect to the weight of the (per)fluoropolymer solids to be produced.

The polymerization process may be carried out in the presence of other materials such as, notably, chain-transfer agents and cross-linking agents.

Non-limiting examples of chain transfer agents suitable for the purpose of the process of the invention include, notably, compounds of formula $R_f(I)_x(Br)_y$, wherein $R_f$ is a $C_1$-$C_8$ (per)fluoro(chloro)alkyl group, x and y are independently integers between 0 and 2, the (x+y) sum being comprised between 1 and 2, such as, e.g., 1,4-diiodoperfluorobutane.

Further chain-transfer agents which may be used include, notably, $C_1$-$C_5$ alkanes such as, e.g., ethane, propane and n-pentane, halogenated hydrocarbons such as, e.g., $CCl_4$, $CHCl_3$, $CH_2Cl_2$, hydrofluorocarbon compounds such as, e.g., $CH_2F$-$CF_3$ (R134a), ethers such as, e.g., dimethyl ether and methyl tert-butyl ether and esters such as, e.g., ethyl acetate and malonic esters.

Non-limiting examples of cross-linking agents suitable for the purpose of the process of the invention include, notably, bis-olefins having formula here below

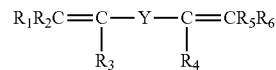

wherein:
$R^1$, $R^2$, $R^3$, $R^4$, $R^5$ and $R^6$, equal to or different from each other, are independently hydrogen atoms or linear or branched $C_1$-$C_5$ alkyl groups;
Y is a linear or branched $C_1$-$C_{18}$ alkylene or cycloalkylene group optionally containing oxygen atoms, preferably at least partially fluorinated, or a (per)fluoropolyoxyalkylene group.

Further cross-linking agents which may be used include, notably, triallyl cyanurate, triallyl isocyanurate, triallyl phosphate, N,N-diallylacrylamide, N,N,N',N'-tetrallylmalonamide, trivinyl isocyanurate, 2,4,6-trivinylmethyltrisiloxane and triazines as described in EP 860436 B (SOLVAY SOLEXIS S.P.A.) 6 May 2004.

The polymerization process of the invention typically results in a latex of a (per)fluoropolymer in water, said latex further comprising at least one surfactant (FS) having formula (I) as described above and an oil phase [phase (O)] as defined above.

The amount of (per)fluoropolymer in the latex typically resulting from the polymerization process generally ranges between 5% and 50% by weight, preferably between 10% and 40% by weight.

The (per)fluoropolymer is dispersed in the latex under the form of particles having an average size of preferably less than 100 nm, more preferably less than 90 nm, even more preferably less than 80 nm, as measured according to ISO 13321.

The (per)fluoropolymer is dispersed in the latex under the form of particles having an average size of preferably more than 1 nm, more preferably more than 3 nm, even more preferably more than 5 nm, as measured according to ISO 13321.

The total amount of surfactant(s) (FS) having formula (I) as described above in the latex typically resulting from the polymerization process generally ranges between 0.001% and 5% by weight, preferably between 0.01% and 2% by weight with respect to the weight of (per)fluoropolymer in the latex.

A (per)fluoropolymer composition comprising at least one surfactant (FS) having formula (I) as described above may be isolated from the latex by coagulation if a polymer in solid form is desired. Also, depending on the requirements of the application in which the (per)fluoropolymer is to be used, the (per)fluoropolymer may be post-fluorinated so as to convert any thermally unstable end groups into stable —$CF_3$ end groups.

The polymerization process may be used to produce a variety of (per)fluoropolymers including perfluoropolymers, which have a fully fluorinated backbone, as well as partially fluorinated fluoropolymers. Also, the polymerization process may result in melt-processable (per)fluoropolymers as well as those that are not melt-processable such as, e.g., polytetrafluoroethylene and so-called modified polytetrafluoroethylene. The polymerization process can further yield (per)fluoropolymers that can be cured to make (per)fluoroelastomers as well as (per)fluorothermoplasts. (Per)fluorothermoplasts are generally (per)fluoropolymers that have a distinct and well noticeable melting point, typically in the range between 60° C. and 320° C. or between 100° C. and 320° C. They thus have a substantial crystalline phase.

(Per)fluoropolymers which are used for making (per)fluoroelastomers are typically amorphous and/or have a neglectable amount of crystallinity such that no or hardly any melting point is discernable for these (per)fluoropolymers.

For coating applications, an aqueous dispersion of the (per)fluoropolymer is desired and hence the (per)fluoropolymer will not need to be separated or coagulated from the latex. To obtain a (per)fluoropolymer dispersion suitable for use in coating applications such as, e.g., in the impregnation of fabrics or in the coating of metal substrates to make for example cookware, it will generally be desired to add stabilizing surfactants and/or to further increase the (per)fluoropolymer solids. Suitable stabilizing surfactants include, notably, non-ionic stabilizing surfactants. The non-ionic stabilizing surfactants are typically added thereto in an amount of from 1% to 12% by weight with respect to the weight of (per)fluoropolymer solids. Non-limitative examples of suitable non-ionic surfactants include, notably, those having general formula $R^1$—O—$[CH_2CH_2O]_n[R^2O]_m$—$R^3$ (NS), wherein $R^1$ represents a $C_6$-$C_{18}$ aromatic or aliphatic hydrocarbon group, $R^2$ represents an alkylene having 3 carbon atoms, $R^3$ represents hydrogen or a $C_1$-$C_3$ alkyl group, n and m independently have a value of 0 to 40 and the (n+m) sum is at least 2. It will be understood that in the general formula (NS) as described above the units indexed by n and m may appear as blocks or they may be present in an alternating or random configuration. Examples of non-ionic surfactants complying with formula (NS) as described above include, notably, alkylphenol oxy ethylates such as ethoxylated p-isooctylphenol commercially available under the brand name TRITON® such as, e.g., TRITON® X 100 wherein the number of ethoxy units is about 10 or TRITON® X 114 wherein the number of ethoxy units is about 7 to 8. Still further examples include, notably, those in which $R^1$ in the above formula (NS) represents a $C_4$-$C_{20}$ alkyl group, m is 0 and $R^3$ is a hydrogen atom. An example thereof includes isotridecanol ethoxylated with about 8 ethoxy groups which is commercially available from Clariant GmbH under the trade name GENAPOL® X 080. Non-ionic surfactants complying with formula (NS) as described above wherein the hydrophilic part comprises a block-copolymer of ethoxy groups and propoxy groups may be used as well. Such non-ionic surfactants are commercially available from Clariant GmbH under the trade names GENAPOL® PF 40 and GENAPOL® PF 80.

The amount of (per)fluoropolymer solids in the aqueous dispersion may be up-concentrated as needed or desired to an amount between 40% and 70% by weight. Any of the known up-concentration techniques may be used including ultra-filtration and thermal up-concentration.

Another object of the present invention is a multi-phase composition comprising:

(A) less than 50% by weight, preferably less than 40% by weight with respect to the total weight of the composition of a water phase [phase (W)];

(B) less than 60% by weight, preferably less than 50% by weight with respect to the total weight of the composition of at least one fluorinated surfactant [surfactant (FS)] having formula (I) here below:

$$R_f—(OCF_2CF_2)_{k-1}—O—CF_2—COOX_a \qquad (I)$$

wherein $R_f$ is a $C_1$-$C_3$ perfluoroalkyl group comprising, optionally, one or more ether oxygen atoms, k is 2 or 3 and $X_a$ is selected from a monovalent metal and an ammonium group of formula $NR^N_4$, wherein $R^N$, equal or different at each occurrence, is a hydrogen atom or a $C_1$-$C_3$ alkyl group;

(C) an oil phase [phase (O)] comprising:

less than 30% by weight, preferably less than 20% by weight with respect to the total weight of the composition of at least one non-functional (per)fluoropolyether (non-functional PFPE) comprising at least one (per)fluoropolyoxyalkylene chain [chain ($R_F$)] and less than 40% by weight, preferably less than 30% by weight with respect to the total weight of the composition of at least one functional (per)fluoropolyether (functional PFPE) comprising at least one (per)fluoropolyoxyalkylene chain [chain ($R'_F$)] and having a number average molecular weight of at least 1000 and a solubility of less than 1% by weight in water at 25° C.

The multi-phase composition of the invention preferably comprises:

(A) from 0.01% by weight to less than 50% by weight, preferably from 0.01% by weight to less than 40% by weight with respect to the total weight of the composition of a water phase [phase (W)];

(B) from 0.01% by weight to less than 60% by weight, preferably from 0.01% by weight to less than 50% by weight with respect to the total weight of the composition of at least one fluorinated surfactant [surfactant (FS)] having formula (I) here below: $R_f$—$(OCF_2CF_2)_{k-1}$—O—$CF_2$—$COOX_a$ (I) wherein $R_f$ is a $C_1$-$C_3$ perfluoroalkyl group comprising, optionally, one or more ether oxygen atoms, k is 2 or 3 and $X_a$ is selected from a monovalent metal and an ammonium group of formula $NR^N_4$, wherein $R^N$, equal or different at each occurrence, is a hydrogen atom or a $C_1$-$C_3$ alkyl group;

(C) an oil phase [phase (O)] comprising:
  from 0.01% by weight to less than 30% by weight, preferably from 0.01% by weight to less than 20% by weight with respect to the total weight of the composition of at least one non-functional (per)fluoropolyether (non-functional PFPE) comprising at least one (per)fluoropolyoxyalkylene chain [chain ($R_F$)] and
  from 0.01% by weight to less than 40% by weight, preferably from 0.01% by weight to less than 30% by weight with respect to the total weight of the composition of at least one functional (per)fluoropolyether (functional PFPE) comprising at least one (per)fluoropolyoxyalkylene chain [chain (R' F)] and having a number average molecular weight of at least 1000 and a solubility of less than 1% by weight in water at 25° C.

The Applicant has surprisingly found that the multi-phase composition according to the present invention may be successfully diluted with water to be advantageously used in the process of the invention, namely in the aqueous polymerization of one or more fluorinated monomers so as to successfully obtain nano-sized fluoropolymer dispersed particles through very fast reaction rates due to high surface area to volume ratio of dispersed nano-sized droplets in the polymerization system.

The multi-phase composition of the invention is preferably a microemulsion. By the term "microemulsion" it is meant a thermodynamically stable, optically transparent, isotropic dispersion at room temperature of two immiscible phases, such as a water phase [phase (W)] and an oil phase [phase (O)], stabilized by an interfacial film of fluorinated surfactant molecules [surfactant (FS)], having homogeneously dispersed therein droplets with an average size of less than 100 nm.

Two types of multi-phase compositions are most likely to be formed depending on the composition:
  oil-in-water (O/W) multi-phase compositions wherein oil droplets are dispersed in the continuous water phase;
  water-in-oil (W/O) multi-phase compositions wherein water droplets are dispersed in the continuous oil phase.

In all two types of multi-phase compositions, the oil-in-water (O/W) or water-in-oil (W/O) interface is stabilized by fluorinated surfactant molecules [surfactant (FS)].

The phase (W), the phase (O) and the surfactant (FS) of the multi-phase composition of the invention are defined as above.

In many cases, the multi-phase composition of the invention may also comprise other materials such as, e.g., solvents.

The Applicant has surprisingly found that a functional PFPE as defined above, having a number average molecular weight of at least 1000 and a solubility of less than 1% by weight in water at 25° C., advantageously enables stabilization of two immiscible phases, a water phase [phase (W)] and an oil phase [phase (O)] as defined above, in the presence of a surfactant (FS) having formula (I) as described above, so that thermodynamically stable multi-phase compositions as defined above can be successfully obtained.

The Applicant has also found that thermodynamically stable multi-phase compositions as defined above having homogeneously dispersed therein droplets with an average size of preferably less than 50 nm, more preferably less than 20 nm, may successfully be obtained at room temperature when the weight ratio of at least one surfactant (FS) having formula (I) as described above to at least one functional PFPE as defined above preferably ranges between 1:0.1 and 1:1, more preferably between 1:0.3 and 1:0.9.

Also, another object of the present invention is a process for recovering at least one surfactant (FS) having formula (I) as described above and at least one functional PFPE as defined above from the (per)fluoropolymer latex comprising the same. The process preferably comprises contacting the (per)fluoropolymer latex with a solid adsorbing material, typically an ion exchange resin, preferably an anion exchange resin: the surfactant (FS) and the functional PFPE as defined above are advantageously adsorbed (at least partially) onto the solid adsorbing material. The surfactant (FS) and the functional PFPE as defined above can be efficiently recovered from solid adsorbing material by standard techniques including elution, thermal desorption and the like. In case of elution, in particular from anion exchange resin, the surfactant (FS) and the functional PFPE as defined above can be recovered by elution with an acidic solution. Typically, an aqueous medium comprising an acid and a water-miscible organic solvent can be used to this aim. Mixtures of inorganic acid and alcohol in water are particularly effective. The surfactant (FS) and the functional PFPE as defined above can be notably recovered from such liquid phases by standard methods including, notably, crystallization, distillation (e.g. under the form of ester) and the like.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

GALDEN® D02 is a non-functional PFPE having formula $CF_3O$—$(CF(CF_3)CF_2O)_n(CF_2O)_m$—$CF_3$, wherein n and m are integers such that the number average molecular weight is about 740.

FLUOROLINK® C10 is a functional PFPE having formula HOOC—$CF_2O(CF_2CF_2O)_{n'}(CF_2O)_{m'}CF_2$—COON, wherein n' and m' are integers such that the number average molecular weight is about 1800.

FLUOROLINK® C07 is a functional PFPE having formula HOOC—$CF_2O(CF_2CF_2O)_{n'}(CF_2O)_{m'}CF_2$—COON, wherein n' and m' are integers such that the number average molecular weight is about 800.

FLUOROLINK® 7850 is a functional PFPE having formula $Cl(C_3F_6O)_n(C_2F_4O)_mCF_2COOH$, wherein n is such that the number average molecular weight is about 600.

Mechanical Stability Test

The (per)fluoropolymer latex (300 ml) was introduced in a 1 lt. conical flask and recycled through a hose-type pump (silicone tube L/S 24 having an internal diameter of 6.4 mm) at a feeding rate of 280 ml/min. The time of recycling was 120 minutes. The percentage loss was evaluated.

EXAMPLE 1

Manufacture of Multi-Phase Composition (1)

In a glass flask, equipped with a stirrer, were mixed under stirring 15.00 g of compound having formula $CF_3CF_2OCF_2CF_2OCF_2COOH$, 8.02 g of a 10% by weight aqueous solution of ammonia and 6.98 g of demineralised water, 11.25 g of FLUOROLINK® C10 functional PFPE and 4.08 g of GALDEN® D02 non-functional PFPE. The pH was adjusted to about 2.2. A multi-phase composition was spontaneously obtained at room temperature which appeared as a limpid, thermodynamically stable solution containing 33.1% by weight of water, 9.0% by weight of GALDEN® D02 non-functional PFPE, 33.1% by weight of fluorinated surfactant having formula $CF_3CF_2OCF_2CF_2OCF_2COONH_4$ and 24.8% by weight of FLUOROLINK® C10 functional PFPE, wherein the weight ratio of $CF_3CF_2OCF_2CF_2OCF_2COONH_4$ to FLUOROLINK® C10 functional PFPE was 1/0.75 [multi-phase composition (1)].

The average size of the homogeneously dispersed droplets was found to be 9.5 nm, as measured according to ISO 13321.

EXAMPLE 2

Manufacture of Multi-Phase Composition (2)

In a glass flask, equipped with a stirrer, were mixed under stirring 26.49 g of compound having formula $CF_3CF_2OCF_2CF_2OCF_2COOH$, 14.17 g of a 10% by weight aqueous solution of ammonia and 0.09 g of demineralised water, 13.25 g of FLUOROLINK® C10 functional PFPE and 6.00 of GALDEN® D02 non-functional PFPE. The pH was adjusted to about 2.0. A multi-phase composition was spontaneously obtained at room temperature which appeared as a limpid, thermodynamically stable solution containing 23.8% by weight of water, 10.0% by weight of GALDEN® D02 non-functional PFPE, 44.1% by weight of fluorinated surfactant having formula $CF_3CF_2OCF_2CF_2OCF_2COONH_4$ and 22.1% by weight of FLUOROLINK® C10 functional PFPE, wherein the weight ratio of $CF_3CF_2OCF_2CF_2OCF_2COONH_4$ to FLUOROLINK® C10 functional PFPE was 1/0.5 [multi-phase composition (2)].

The average size of the homogeneously dispersed droplets was found to be 13.5 nm, as measured according to ISO 13321.

The multi-phase compositions (1) and (2) of Examples 1 and 2 of the invention could be successfully diluted with water at room temperature to yield a kinetically-stable, optically transparent, isotropic dispersion of nano-sized droplets to be suitably used in the process of the invention.

EXAMPLE 3 (COMPARATIVE)

Thermodynamically stable multi-phase compositions of a water phase and an oil phase with droplets having an average size of more than 100 nm, as measured according to ISO 13321, were obtained at room temperature by addition of a fluorinated surfactant having formula $CF_3CF_2OCF_2CF_2OCF_2COONH_4$ (see Table 1 here below).

TABLE 1

| Water | GALDEN® D02 PFPE | $C_2F_5OCF_2CF_2OCF_2COONH_4$ | Average size |
|---|---|---|---|
| 42.0% wt. | 30.0% wt. | 28.0% wt. | 136 nm |
| 47.0% wt. | 40.0% wt. | 13.0% wt. | 108 nm |

As compared with multi-phase compositions of Examples 1 and 2 of the invention, these compositions, lacking functional PFPE, were found to give rapid coalescence of droplets towards larger size when diluted with water. As a consequence, these compositions, when used as polymerizing media, were found not to be suitable for obtaining nano-sized (per)fluoropolymer dispersed particles.

EXAMPLE 4 (COMPARATIVE)

A multi-phase composition was obtained at room temperature containing 33.5% by weight of water, 8.0% by weight of GALDEN® D02 non-functional PFPE, 33.4% by weight of fluorinated surfactant having formula $CF_3CF_2OCF_2CF_2OCF_2COONH_4$ and 25.1% by weight of FLUOROLINK® C07 functional PFPE, wherein the weight ratio of $CF_3CF_2OCF_2CF_2OCF_2COONH_4$ to FLUOROLINK® C07 functional PFPE was 1/0.75.

The average size of the homogeneously dispersed droplets was found to be 26 nm, as measured according to ISO 13321.

EXAMPLE 5 (COMPARATIVE)

A multi-phase composition was obtained at room temperature containing 33.6% by weight of water, 7.5% by weight of GALDEN® D02 non-functional PFPE, 33.6% by weight of fluorinated surfactant having formula $CF_3CF_2OCF_2CF_2OCF_2COONH_4$ and 25.2% by weight of a functional PFPE having formula $HOOC-CF_2O(CF_2CF_2O)_{n'}(CF_2O)_{m'}CF_2-COOH$, wherein n' and m' are integers such that the number average molecular weight is about 460, wherein the weight ratio of $CF_3CF_2OCF_2CF_2OCF_2COONH_4$ to the functional PFPE was 1/0.75.

As compared with multi-phase compositions of Examples 1 and 2 of the invention, the compositions of comparative Examples 4 and 5 comprising functional PFPE of lower number average molecular weight could not be successfully diluted with water at room temperature to yield a kinetically-stable, optically transparent, isotropic dispersion of nano-sized droplets. As a consequence, these compositions could not be used as polymerizing medium for obtaining nano-sized (per)fluoropolymer dispersed particles with high reaction rates.

EXAMPLE 6 (COMPARATIVE)

Same procedures as detailed in Examples 1 and 2 were followed but using an ammonium salt of FLUOROLINK® C10 functional PFPE having a solubility in water at 25° C. largely exceeding 1% by weight.

As compared with multi-phase compositions of Examples 1 and 2 of the invention, the so obtained compositions were found to lack stability: rapid coalescence of droplets towards larger size was observed upon mixing. As a consequence, these compositions were found not to be suitable for being used as polymerizing media for obtaining nano-sized (per)fluoropolymer dispersed particles.

EXAMPLE 7

Polymerization of Tetrafluoroethylene (TFE) and Perfluoropropyl Vinyl Ether (PPVE)

A reactor having an inner volume of 5 lt., equipped with a mechanical stirrer (470 rpm), was charged with 3 lt. of demineralised water and 33 g of the multi-phase composition (1) prepared as in Example 1.

The reactor was heated to 75° C. and vented for a few minutes.

The reactor was then charged with 50 g of PPVE, pressurized with ethane to a pressure of 250 mbar and finally pressurized with TFE to a set-point pressure of 20 bar.

Polymerization was initiated by addition of ammonium persulfate (0.3 g introduced at the beginning and 0.84 g further injected in seven portions in combination with further additions of PPVE to a total of 80 g).

Polymerization was pursued until reaching overall monomers consumption of 1500 g after 147 min, then the reactor was depressurized, vented and cooled.

A latex having a solid content of 34% by weight was obtained comprising particles having an average size of 77 nm, as measured according to ISO 13321, of a TFE/PPVE copolymer (PPVE: 5.2% by weight of copolymer) having a melt flow index of 13 g/10 min (372° C./5 Kg, measured according to ASTM D 1238), a melting point of 300.5° C., as measured by DSC analysis, and a heat of crystallization of −28.5 J/g, as measured according to ASTM D 3418.

EXAMPLE 8

Polymerization of TFE, Vinylidene Fluoride (VDF) and Hexafluoropropylene (HFP)

Same procedure as detailed in Example 7 was followed but charging the reactor with 3.5 lt. of demineralised water and 35 ml of the multi-phase composition (1) prepared as in Example 1.

The reactor was heated to 80° C.

The reactor was then pressurized with HFP to a pressure of 8.56 bar and finally pressurized with a feed gas mixture of VDF (70% by moles), HFP (19% by moles) and TFE (11% by moles) to a set-point pressure of 26 bar. The reactor was then charged with 0.66 ml of 1,4-diiodoperfluorobutane and 0.23 ml of $H_2C=CH—(CF_2)_6—CH=CH_2$.

Polymerization was initiated by addition of ammonium persulfate (0.36 g introduced at the beginning and 0.17 g further injected after 20% by weight of monomer conversions in combination with further additions of the 1,4-diiodoperfluorobutane to a total of 4.13 ml and of $H_2C=CH—(CF_2)_6—CH=CH_2$ to a total of 3.38 ml).

Polymerization was pursued until reaching overall monomers consumption of 1500 g after 97 min.

A latex having a solid content of 30.8% by weight was obtained comprising particles having an average size of 57 nm, as measured according to ISO 13321, of a VDF/HFP/TFE copolymer (VDF:HFP:TFE 70.6:17.7:11.7% by moles).

EXAMPLE 9

Polymerization of TFE, VDF and HFP

Same procedure as detailed in Example 8 was followed but charging the reactor with 35 ml of the multi-phase composition (2) prepared as in Example 2 and pursuing polymerization until reaching overall monomers consumption of 1500 g after 100 min.

A latex having a solid content of 31.5% by weight was obtained comprising particles having an average size of 57 nm, as measured according to ISO 13321, of a VDF/HFP/TFE copolymer (VDF:HFP:TFE 70.6:17.7:11.7% by moles).

EXAMPLE 10 (COMPARATIVE)

Polymerization of TFE, VDF and HFP

Same procedure as detailed in Example 8 was followed but charging the reactor with 35 ml of a multi-phase composition prepared by mixing 50.0% by weight of an aqueous solution of ammonia, 20.0% by weight of GALDEN® D02 non-functional PFPE and 30.0% by weight of FLUOROLINK® 7850 fluorinated surfactant, wherein the average size of the homogeneously dispersed droplets was found to be 10 nm, as measured according to ISO 13321, and the pH was adjusted to about 8.5. A latex having a solid content of 29.3% by weight was obtained comprising particles having an average size of 79 nm, as measured according to ISO 13321, of a VDF/HFP/TFE copolymer (VDF:HFP:TFE 70.6:17.8:11.6% by moles).

Recirculation tests showed an improved mechanical stability of the latexes prepared as detailed in Examples 8 and 9 of the invention with respect to latex so obtained while operating in the presence of a multi-phase medium stabilized by FLUOROLINK® 7850 fluorinated surfactant having lower number average molecular weight (see Table 2 here below).

TABLE 2

| Time [min] | Loss [%] (Example 8) | Loss [%] (Example 9) | Loss [%] (Example 10) |
|---|---|---|---|
| 0 | — | — | — |
| 15 | 0% | 0% | −1% |
| 30 | 0% | 0% | −1% |
| 60 | 0% | 0% | −1% |
| 90 | 0% | 0% | −1% |
| 120 | 0% | −1% | −2% |

The invention claimed is:

1. A process for manufacturing a (per)fluoropolymer, said process comprising polymerizing one or more fluorinated monomers in the presence of a multi-phase medium, said medium comprising:

(A) a water phase (W);

(B) at least one fluorinated surfactant (FS) having formula (I) here below:

$$R_f—(OCF_2CF_2)_{k-1}—O—CF_2—COOX_a \quad (I)$$

wherein $R_f$ is a $C_1$-$C_3$ perfluoroalkyl group comprising, optionally, one or more ether oxygen atoms, k is 2 or 3 and $X_a$ is selected from the group consisting of a monovalent metal and an ammonium group of formula $NR^N_4$, wherein $R^N$, equal or different at each occurrence, is a hydrogen atom or a $C_1$-$C_3$ alkyl group;

(C) an oil phase (O) comprising:

at least one non-functional (per)fluoropolyether (non-functional PFPE) comprising at least one (per)fluoropolyoxyalkylene chain ($R_F$) and free from functional end-groups, and at least one functional (per)fluoropolyether (functional PFPE) comprising at least one (per)fluoropolyoxyalkylene chain ($R'_F$)] and having a number average molecular weight of at least 1000 and a solubility of less than 1% by weight in water at 25° C.;

wherein the at least one non-functional (per)fluoropolyether is present in an amount ranging from 0.01% to less than 30% by weight of the total weight of the multi-phase medium.

2. The process of claim 1, wherein the surfactant (FS) complies with formula (II) here below:

$$R_f'O-CF_2CF_2-O-CF_2-COOX_a' \quad (II)$$

wherein:
$R_f'$ is a $C_1$-$C_3$ perfluoroalkyl group;
$X_a'$ is selected from the group consisting of Li, Na, K, $NH_4$ and $NR^{N'}{}_4$, wherein $R^{N'}$ is a $C_1$-$C_3$ alkyl group.

3. The process of claim 1, wherein the surfactant (FS) complies with formula (III) here below:

$$CF_3CF_2O-CF_2CF_2-O-CF_2-COOX_a' \quad (III)$$

wherein $X_a'$ is selected from the group consisting of Li, Na, K, $NH_4$ and $NR^{N'}{}_4$, wherein $R^{N'}$ is a $C_1$-$C_3$ alkyl group.

4. The process of claim 1, wherein the non-functional PFPE is selected from the group consisting of:

$$T_1-O-[CF(CF_3)CF_2O]_{b1'}(CFYO)_{b2'}-T^{1'} \quad (1)$$

wherein:
$T^1$ and $T^{1'}$, equal to or different from each other, are independently selected from the group consisting of $-CF_3$, $-C_2F_5$ and $-C_3F_7$ groups;
Y, equal or different at each occurrence, is selected from the group consisting of a fluorine atom and a $-CF_3$ group;
$b1'$ and $b2'$, equal to or different from each other, are independently integers ≥0 such that the $b1'/2'$ ratio is comprised between 20 and 1000 and the $(b1'+b2')$ sum is comprised between 5 and 250; should $b1'$ and $b2'$ be both different from zero, the different recurring units are generally statistically distributed along the perfluoropolyoxyalkylene chain;

$$T^1-O-[CF(CF_3)CF_2O]_{c1'}(C_2F_4O)_{c2'}(CFYO)_{c3'}-T^{1'} \quad (2)$$

wherein:
$T^1$ and $T^{1'}$ equal to or different from each other, have the same meaning as defined above;
Y, equal or different at each occurrence, has the same meaning as defined above;
$c^{1'}$, $c^{2'}$ and $c^{3'}$, equal to or different from each other, are independently integers ≥0 such that the $(c1'+c2'+c3')$ sum is comprised between 5 and 250; should at least two of $c^{1'}$, $c2'$ and $c3'$ be different from zero, the different recurring units are generally statistically distributed along the perfluoropolyoxyalkylene chain;

$$T^1-O-(C_2F_4O)_{d1'}(CF_2O)_{d2'}-T^{1'} \quad (3)$$

wherein:
$T^1$ and $T^{1'}$, equal to or different from each other, have the same meaning as defined above;
$d^{1'}$ and $d^{2'}$, equal to or different from each other, are independently integers ≥0 such that the $d1'/d2'$ ratio is comprised between 0.1 and 5 and the $(d1'+(d2')$ sum is comprised between 5 and 250; should $d1'$ and $d2'$ be both different from zero, the different recurring units are generally statistically distributed along the perfluoropolyoxyalkylene chain;

$$T^2-O-[CF(CF_3)CF_2O]_{e'}-T^{2'} \quad (4)$$

wherein:
$T^2$ and $T^{2'}$, equal to or different from each other, are independently selected from the group consisting of $-C_2F_5$ and $-C_3F_7$ groups;
$e'$ is an integer comprised between 5 and 250

$$T^2-O-(CF_2CF_2O)_{f'}-T^{2'} \quad (5)$$

wherein:
$T^2$ and $T^{2'}$, equal to or different from each other, have the same meaning as defined above;
$f'$ is an integer comprised between 5 and 250;

$$T1-O-(CF_2CF_2C(Hal')_2O)_{g1'}-(CF_2CF_2CH_2O)_{g2'}-(CF_2CF_2CH(Hal')_{g3'}-T^{1'} \quad (6)$$

wherein:
$T^1$ and $T^{1'}$, equal to or different from each other, have the same meaning as defined above;
Hal' is fluorine;
$g1'$, $g2'$, and $g3'$, equal to or different from each other, are independently integers ≥0 such that the $(g1'+g2'+g3')$ sum is comprised between 5 and 250; should at least two of $g1'$, $g2'$ and $g3'$ be different from zero, the different recurring units are generally statistically distributed along the (p)fluoropolyoxyalkylene chain; and $$R^1_f-\{C(CF_3)_2-O-[C(R^2_f)_2]_{j1'}C(R^2_f)_2-O\}_{j2'}-R^1_f \quad (7)$$

wherein:
$R^1_f$, equal or different at each occurrence, is a $C_1$-$C_6$ perfluoroalkyl group;
$R^2_f$, equal or different at each occurrence, is selected from the group consisting of a fluorine atom and a $C_1$-$C_6$ perfluoroalkyl group;
$j1'$ is equal to 1 or 2;
$j2'$ is an integer comprised between 5 and 250.

5. The process of claim 1, wherein the functional PFPE comprises at least one functional end-group selected from the group consisting of carboxylic acid, phosphonic acid and sulphonic acid groups.

6. The process of claim 5, wherein the functional PFPE complies with formula (IV) here below:

$$T_1-(CFW_1)_{p1}-O-R_F-(CFW_2)_{p2}-T_2 \quad (IV)$$

wherein;
$R_F$ is a (per)fluoropolyoxyalkylene chain (chain $R'_F$) such that the number average molecular weight of the functional PFPE is at least 1000;
$T_1$ and $T_2$, equal to or different from each other, are selected from the group consisting of:
i) functional end-groups selected from the group consisting of carboxylic acid, phosphoric acid and sulphonic acid groups, and
ii) non-functional end-groups selected from the group consisting of a fluorine atom and a $C_1$-$C_3$ (per)fluoroalkyl group,
with the proviso that at least one of $T_1$ and $T_2$ is a functional end-group;
$W_1$ and $W_2$, equal to or different from each other, independently represent a fluorine atom or a $-CF_3$ group;
$p_1$ and $p_2$, equal to or different from each other, are independently integers comprised between 1 and 3.

7. The process of claim 1, wherein the functional PFPE is a bifunctional PFPE complying with formula (VI) here below;

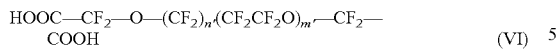
                                                                    (VI)

wherein n' and m' are independently integers 0 such that the number average molecular weight of the bifunctional PFPE is at least 1000, the recurring units being generally statistically distributed along the perfluoropolyoxyalkylene chain.

8. The process of claim 1, wherein the weight ratio of said at least one surfactant (FS) having said formula (I) to said at least one functional PFPE ranges between 1:0.3 and 1:0.9.

9. The process of claim 1, wherein $R_f$ is a (per)fluoropolyoxyalkylene chain ($R'_F$) such that the number average molecular weight of the functional PFPE is at least 1500.

10. The process of claim 7, wherein n' and m' are independently integers >0 such that the number average molecular weight of the bifunctional PFPE is at least 1500.

11. The process of claim 1, wherein the fluorinated surfactant (FS) and the functional PFPE are present in a weight ratio of between 1:0.1 and 1:1.

12. The process of claim 1, wherein the fluorinated surfactant (FS) and the functional PFPE are present in a weight ratio of between 1:0.3 and 1:0.9.

* * * * *